United States Patent Office 2,816,902
Patented Dec. 17, 1957

2,816,902

HYDROXYLATED STEROIDS

David H. Gould, Leonia, and Elliot L. Shapiro, Irvington, N. J., assignors to Schering Corporation, Bloomfield, N. J., a corporation of New Jersey No Drawing. Application January 14, 1957, Serial No. 633,851

9 Claims. (Cl. 260—397.45)

This invention relates to a new group of hydroxylated steroids which are useful in the treatment of arthritis and similar inflammatory diseases. More particularly, our invention relates to 6-hydroxy derivatives of 9α-fluoroprednisone, 9α-fluoroprednisolone and their esters. Our new compounds may be represented by the following formula:

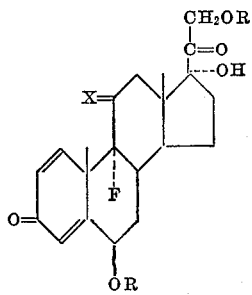

wherein X is a member of the group consisting of O and (H, OH), and R is a member of the group consisting of carboxylic acid radicals of lower alkanoic acids and acyl residues described below.

The new compound of the general formula, solely for the purpose of the present discussion, may be considered as evolving from 9α-fluoroprednisone (9α-fluoro-1,4-pregnadiene-17α,21-diol-3,11,20-trione) or 9α-fluoroprednisolone (9α-fluoro-1,4-pregnadiene-11β,17α,21-triol-3,20-dione). 9α-fluoroprednisolone is known to be a potent gluco-corticoid supposedly useful in the treatment of inflammatory processes, such as rheumatoid arthritis. The high mineralocorticoid effect of 9α-fluoroprednisolone influences electrolyte balance and causes severe edematous conditions, thus preventing its use in the treatment of arthritis. We have found that the introduction of an oxygen function, i. e., a hydroxyl group or an ester thereof into the 6-position of 9α-fluoroprednisone or 9α-fluoroprednisolone, reduces the mineralocorticoid activity to an innocuous level without concomitant alteration of the glucocorticoid activity. Thus, the new compounds of our invention exhibit a favorable therapeutic ratio and provide for agents which are useful in treatment and alleviation of inflammatory conditions.

Further to their therapeutic use per se, the new 6-hydroxylated steroids of our invention may be converted by dehydration into a 1,4,6-pregnatriene which, as described in Union of South Africa, Patent No. 1579/56, is also a potent anti-inflammatory agent. The conversion of the 6-hydroxy compounds of the invention to the pregnatrienes may be carried out by reacting a 21-ester of a compound of the general formula with a sulfonating agent, such as p-toluenesulfonyl chloride in pyridine whereupon there is obtained the corresponding 6-tosylate. Heating the tosylate with a high boiling base such as refluxing diethyl aniline, affords the therapeutically active triene. Specifically, from 9α-fluoro-1,4-pregnadiene-6,17α,21-triol-3,11,20-trione 21-ester, there is obtained 9α-fluoro-1,4,6-pregnatriene-17α, 21-diol-3,11,20-trione 21-ester.

The compounds of our invention may be used in the form of their ester derivatives of the 6- and 21-hydroxyl groups. Both groups may be esterified, or preferably the 21-position is esterified. As has been generally found in the art, esterification is of some value in extending the duration of activity, as evidenced by the properties of an acetate, propionate, iso-valerate, enanthate, cyclopenthylpropionate and the like. In addition to aliphatic esters, we have found that other esters, such as phenoxyacetates and substituted phenoxyacetates, such as 4-chloro-, 2-dichloro-, 4-bromo-, 4-methyl, 4-t. butyl, 2,4,5-trichloro- and 4-methoxyphenoxyacetates are of particular value. In addition, we have found that furoates including 5-bromo-, 5-chloro-, 5-methyl and 5-t. butyl furoates increase the duration of activity over the un-esterified steroid.

For the most part, the esters recited above, are water insoluble. We have found that water soluble derivatives at C–21 and/or at C–6, such as salts of esters of the steroid with acids such as succinic, phathalic, sulfonic, phosphoric, glycinic and the like, allow for the preparation of a water soluble derivative.

The new compounds of our invention may be administered orally in the form of tablets or capsules, parenterally as aqueous or oral suspensions or solutions, or they may be applied topically in the form of lotions, ointments or suspensions.

Although the present art has developed to the extent that there are a multitude of paths leading to the formation of the compounds of our invention, we prefer to use, as starting material, the corresponding 6-desoxy steroid. We introduce an oxygen function into the 6-position by first effecting a β-halogenation upon a 3-keto-1,4-pregnadiene, such as by reacting the 21-acetate of 9α-fluoroprednisolone with N-bromosuccinimide. The intermediary 6-bromo compound is acyloxylated in a known manner, such as by reaction with potassium acetate, whereupon there is obtained the corresponding 6-acetoxy compound.

Hydrolysis of the ester groups may be carried out chemically, or preferably microbiologically, by means of the microorganism *Flavobacterium dehydrogenans* var. *hydrolyticum* according to analogous procedures described in Union of South Africa, Patent No. 3462/55.

We have found that in compounds of the general formula, the 21-position is selectively esterified in preference to the 6-position and thus under a prescribed set of conditions, a 21-ester may be prepared. By increasing the quantity of acylating agent, and raising the temperature of reaction, esterification at more than one hydroxylated position is effected.

The following examples illustrate methods for the preparation of the new compounds of our invention. It will be apparent to one skilled in the art that other methods which are obviously chemical equivalents may be applied with similar advantage.

The following examples are illustrative of our invention:

I. 6-bromo-9α-fluoroprednisone 21-acetate

Ten grams of 9α-fluoroprednisone 21-acetate is dissolved at reflux in 2400 ml. of chlorobenzene and 2400 ml. of carbon tetrachloride. 100 ml. of solvent is distilled off to dry the apparatus and argon gas is bubbled in to displace air. N-bromosuccinimide (5.4 g.) is added along with 200 mg. of benzoyl peroxide and the mixture is refluxed and irradiated with a 300-watt photoflood lamp for 30 minutes. Water is added and the mixture is extracted with methylene chloride. The organic layer after washing neutral with water is evaporated in a draft at room temperature, and the amorphous residue (12 g.), consisting of the 6-bromo compound of this example, is used directly in the next step.

II. 6-acetoxy-9α-fluoroprednisone 21-acetate

Ten grams of the product of Example I is dissolved in 1 liter of acetone, treated with 20 g. of potassium acetate and refluxed with stirring for 18 hours. The hot mixture is filtered and evaporated to a residue which is triturated in warm water, filtered and dried. The substance so obtained, containing some 9α-fluoro-1,4,6-pregnatriene-11β,17α,21-triol-3,20-dione 21-acetate as shown by ultraviolet absorption at 295 mμ, is chromatographed on activated magnesium silicate. The fraction eluted with 0.5% methanol in methylene chloride is crystallized from acetone-hexane yielding the product of this example, $$\lambda_{max}^{Nujol}$$

2.98 μ, 5.75 μ, 5.85μ, 6.03 μ, 6.14, 6.22 μ, 8.10, 9.59, 9.65. Crystallization from ethylacetate of the fraction eluted with 1% methanol in methylene chloride affords the isomeric steroid (with respect to the 6-position) having a similar infrared spectrum of functional group bands.

III. 9α-fluoro-1,4-pregnadiene-6,17α,21-triol-3,11,20-trione

A mixture is prepared of 1 g. of yeast extract concentrate and 1 ml. each of 2 M. potassium dihydrogen phosphate and 2 M. disodium phosphate in each 100 ml. Ten Erlenmeyer flasks (300 ml.) containing 100 ml. each are sterilized and inoculated with *Flavobacterium dehydrogenans* var. *hydrolyticum*. The flasks are shaken at 30° for 16 hours, and to each is added a solution of 50 mg. of the main product of Example II in 5 ml. of methanol. The cultures are shaken at 30° for 24 hours and the combined broths are extracted three times with 300 ml. of methylene chloride. The extracts are dried, filtered and evaporated to dryness. The residue is crystallized from acetone-hexane yielding the above identified product, $$\lambda_{max}^{Nujol}$$

2.92, 299 μ, 5.86 μ, 6.02 μ, 6.14, 6.23 μ, 9.50, 967.

IV. 9α-fluoroprednisolone, 11,17,21-triacetate

Ten grams of 9α-fluoroprednisolone 21-acetate is dissolved in 150 ml. of acetic acid and 150 ml. of acetic anhydride and treated with 1.25 g. of p-toluenesulfonic acid. The mixture is shaken and stirred for 48 hours at room temperature and poured into water (1.5 l.). After standing for 3 hours, the crystalline product is filtered off, dried at 60° C. and recrystallized from acetone-hexane, M. P. 220–222°, $$\lambda_{max}^{MeOH} \ 236 \ m\mu$$

V. 6-bromo-9α-fluoroprednisolone triacetate

The product of this example is obtained by reacting 10 g. of the product of Example IV, with 4.3 g. of N-bromosuccinimide according to the procedure of Example I, $$\lambda_{max}^{MeOH} \ 240 \ m\mu$$

VI. 6-acetoxy-9α-fluoroprednisolone triacetate

The process of Example II is applied to 10 g. of the product of Example V. Chromatography of the reaction product on activated magnesium silicate gives the tetraacetate in the fraction eluted with 100% methylene chloride. On crystallization from acetone-hexane, it shows $$\lambda_{max}^{Nujol}$$

5.71, 5.75 μ, 5.79 μ, 6.01 μ, 6.14, 6.22 μ, 8.17 μ, 9.57, 9.62 μ. The fraction eluted with 0.5% methanol in methylene chloride is crystallized from ethyl acetate to give the other 6-isomer having the same functional bands in the infrared spectrum.

VII. 9α-fluoro-1,4-pregnadiene-6,11β,17α,21-tetrol-3,20-dione

The procedure of Example III is applied to the product of Example VI, (eluted with 100% methylene chloride) fermenting for 48 hours. Crystallization of the extracted residue from acetone affords the compound of this example.

VIII. 9α-fluoro-1,4-pregnadiene-6,17α,21-triol-3,11,20-trione 21-acetate

A sample of 2 g. of the product of Example III is dissolved in 50 ml. of dry pyridine and poured onto 0.55 g. of acetic anhydride in an anhydrous atmosphere. The solution is stirred for 30 minutes and poured into dilute sulfuric acid in ice. The precipitate is filtered off, dried and crystallized from methanol to give 9α-fluoro-1,4-pregnadiene-6,17α,21-triol-3,11,20-trione 21-acetate.

IX. 9α-fluoro-1,4-pregnadiene-6,11β,17α,21-tetrol-3,20-dione 21-acetate

In the same manner as in Example VIII using 500 mg. of the product of Example VII in 15 ml. of pyridine and 140 mg. of acetic anhydride, the product of this example is obtained which is crystallized from acetone to give 9α-fluoro-1,4-pregnadiene-6,11β,17α,21-tetrol,3,20-dione 21-acetate.

X. 9α-fluoro-1,4-pregnadiene-6,17α,21-triol-3,11,20-trione 6-benzoate 21-acetate A sample of 1.0 g. of the product of Example VIII is dissolved in 50 ml. of dry pyridine. To the solution is added 1 g. of benzoyl chloride and the mixture is stirred for one hour. The solution is poured into aqueous sulfuric acid and ice, and the precipitate which forms is filtered off, washed with water and dried. The material is crystallized from acetone-methanol to give 9α-fluoro-1,4-pregnadiene-6,17α,21-triol-3,11,20-trione 6-benzoate 21-acetate.

XI. 9α-fluoro-1,4-pregnadiene-6,11β,17α,21-tetrol-3,20-dione 6-p-toluenesulfonate 21-acetate A sample of 0.1 g. of the product of Example IX is treated as in Example X with 100 mg. of p-toluenesulfonyl chloride. The mixture is stirred one hour at room temperature and the precipitate formed on pouring into aqueous sulfuric acid is filtered off, dried and crystallized from acetone-hexane to give 9α-fluoro-1,4-pregnadiene-6,11β,17α,21-tetrol-3,20-dione 6-p-toluenesulfonate 21-acetate.

XII. 9α-fluoro-1,4,6-pregnatriene-17α,21-diol-3,11,20-trione 21-acetate

A sample of 200 mg. of the product of Example X is placed in 5 ml. of boiling diethylaniline in a nitrogen atmosphere. The mixture is refluxed 30 minutes and poured into dilute sulfuric acid and ice. The collected product is washed with water, dried, dissolved in methylene chloride, and poured onto a column of activated magnesium silicate. The column is washed first with hexane. The fraction eluted with 1:1 ether-methylene chloride is crystallized from acetone-hexane to give 9α-fluoro-1,4,6-pregnatriene-17α,21-diol-3,11,20-trione 21-acetate, $$\lambda_{max}^{MeOH}$$

222 mμ, 252 mμ, 296 mμ.

XIII. 9α-fluoro-1,4,6-pregnatriene-11β,17α,21-triol-3,20-dione 21-acetate

A sample of 200 mg. of the product of Example XI is treated as in Example XII with 5 ml. of refluxing 2,4,6-collidine. The product is chromatographed and the fraction eluted with 0.1% methanol in methylene chloride, is crystallized from ethyl acetate to give 9α-fluoro-1,4,6-pregnatriene-11β,17α,21-triol-3,20-dione 21-acetate, showing an ultraviolet spectrum with λ max=222, 253, 295 mμ in methanol.

We claim:
1. Steroid compounds having the following structural formula:

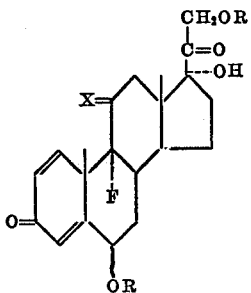

wherein X is a member of the group consisting of O and (H,OH) and R is a member of the group consisting of H and lower alkanoic acid radicals.

2. Steroid compounds having the formula:

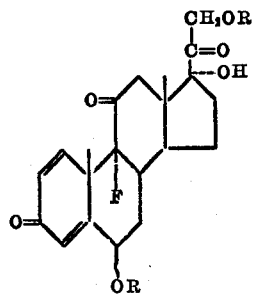

wherein R is a lower alkanoic acid radical.

3. Steroid compounds having the formula:

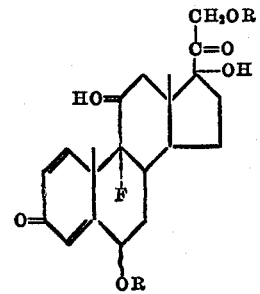

wherein R is a lower alkanoic acid radical.

4. Steroid compounds having the formula:

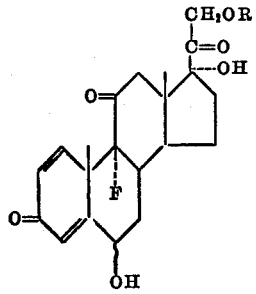

wherein R is a lower alkanoic acid radical.

5. Steroid compounds having the formula:

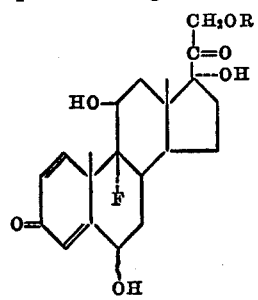

wherein R is a lower alkanoic acid radical.

6. 9α-fluoro-1,4-pregnadiene-6,11β,17α,21-tetrol-3,20-dione.
7. 9α-fluoro-1,4-pregnadiene-6,17α,21-triol-3,11,20-trione.
8. 9α-fluoro-1,4-pregnadiene-6,11β,17α,21-tetrol-3,20-dione 21-acetate.
9. 9α-fluoro-1,4-pregnadiene-6,11β,17α,21-tetrol-3,20-dione 6,21-diacetate.

No references cited.